US006932333B2

(12) United States Patent
Bode

(10) Patent No.: US 6,932,333 B2
(45) Date of Patent: Aug. 23, 2005

(54) SWING CLAMP

(76) Inventor: Gerd Bruno Bode, 302 Erie Ave., Seattle, WA (US) 98122

( * ) Notice: Subject to any disclaimer, the term of this patent is extended or adjusted under 35 U.S.C. 154(b) by 107 days.

(21) Appl. No.: 10/648,171

(22) Filed: Aug. 26, 2003

(65) Prior Publication Data

US 2004/0041322 A1 Mar. 4, 2004

Related U.S. Application Data

(60) Provisional application No. 60/407,844, filed on Aug. 30, 2002.

(51) Int. Cl.[7] .................................................. B23Q 3/08
(52) U.S. Cl. .......................................................... 269/24
(58) Field of Search .............................. 269/32, 24, 27, 269/91, 93, 33, 94, 158

(56) References Cited

U.S. PATENT DOCUMENTS 1,245,638 A * 11/1917 Trcka ......................... 269/158
4,508,327 A * 4/1985 Ersoy .......................... 269/23

OTHER PUBLICATIONS

"Bottom Flange / Manifold Mount Swing Clamps," © 2000 Vektek, Inc., <http://www.vektek.com/secure/30.htm> [retrieved Aug. 21, 2002].
"ILS150200 REV B" [Drawing], n.d., Vektek, Inc., <http://www.vektek.com/secure/26.htg/150200.gif> [retrieved Aug. 21, 2002].
"Long Stroke Swing Clamp," © 1996–2002 Vektek, Inc., <http://www.vektek.com/secure/27.htm> [retrieved Aug. 21, 2002].
"Pneumatic Swing Clamps: RSC–8920–010 and RSC–8920–025," Aug. 2, 2002, *Robohand, Inc. Technical Catalog, including Technical Specifications and Maintenance Information*, <http://www.robohand.com>, pp. 7.7–7.19.
"Swing Clamp: Threaded Long Stroke Specifications," *Catalog*, Vektek, Inc., as early as Aug. 21, 2002, p. C–5.
"Swing Clamp Arms," © 2000 Vektek, Inc., <http://www.vektek.com/secure/26.htm> [retrieved Aug. 21, 2002].
"Swing Clamp FAQ's," © 1996–2000 Vektek, Inc., <http://www.vektek.com/secure/scfaq.htm> [retrieved Aug. 21, 2002].
"Threaded Swing Clamps," © 2000 Vektek, Inc., <http://www.vektek.com/secure/24.htm> [retrieved Aug. 21, 2002].

* cited by examiner

*Primary Examiner*—Robert C. Watson
(74) *Attorney, Agent, or Firm*—Christensen O'Connor Johnson Kindness PLLC

(57) ABSTRACT

A swing clamp (100) for selectively clamping a workpiece (58) having a surface to be worked upon to a support surface is provided. The swing clamp includes a housing (108) and an actuator (101) at least partially disposed within the housing. A clamp arm (102) is coupled to the actuator, wherein the actuator is adapted to actuate the clamp arm between a clamped position, an unclamped position, and a retracted position in which the clamp arm is adapted to be disposed below an elevation of the surface to be worked upon.

24 Claims, 6 Drawing Sheets

SWING CLAMP

CROSS-REFERENCE TO RELATED APPLICATION

This application claims the benefit of U.S. Provisional Patent Application No. 60/407,844, filed Aug. 30, 2002, priority from the filing date of which is hereby claimed under 35 U.S.C. §119 and the disclosure of which is hereby expressly incorporated by reference.

FIELD OF THE INVENTION

The present invention relates generally to clamps and, more particularly, to swing clamps selectively actuatable between a clamped position and an unclamped position.

BACKGROUND OF THE INVENTION

Machining operations often require clamps to hold a workpiece stationary during machining operations. Manually operated mechanical clamps have been used in the past for this purpose. More recently, manually controlled, electrical, pneumatic and hydraulically actuated clamps have been developed. While clamps can be electrical or mechanical, most modern clamps are pneumatically or hydraulically actuated. Still more recently, in order to accommodate modem machining operations, programmable clamps have been developed. Programmable clamps are designed for rapid movement between a clamped position and an unclamped position. The actuation of programmable clamps may be controlled by a computer or similar controller to permit the actuation of the clamp between a clamped and unclamped position without direct human intervention. Manual manipulations required by manually operated clamps are avoided, labor costs are reduced, and manufacturing times are decreased.

Unfortunately, existing manually controlled and programmable clamps are not without their problems. For instance, as a machining device machines a workpiece into a desired shape, the machining device may have to be positioned in or pass through a location occupied by a clamp. In order to avoid conflict, the clamp must be disengaged and displaced from the workpiece to allow access to the area by the machining device, causing significant increases in manufacturing cost and time.

One previously developed solution to the foregoing disengagement problem is the swing clamp. A swing clamp has a clamp arm that is rotated 90 degrees as the clamp arm is moved from a clamped position to an unclamped position, thereby partially displacing the clamp arm from the workpiece. Thus swing clamps permit some additional access to a work piece in the vicinity of such clamps. However, previously developed swing clamps are not without their problems. For instance, the clamp arms of previously developed swing clamps rise above the workpiece when moving to the unclamped position and rotating by 90 degrees. After rotation, the arms remain raised. This is often undesirable because a machining device having a part or component that extends horizontally outward from the cutting tool of the machining device may impact the raised clamp arm as the machining device works in the vicinity of the workpiece previously engaged by the clamp arm. Thus previously developed swing clamps can interfere with machining operations and potentially cause damage, if the machining device impacts a raised clamp arm.

Thus there exists a need for a swing clamp having an unclamped position such that no part of the swing clamp will interfere with machining operations in the vicinity of the clamp. Further, a need exists not only for a swing clamp that allows increased access of a machining device to a workpiece in the vicinity of the clamp, but is also economical to manufacture and has a high degree of reliability.

SUMMARY OF THE INVENTION

One embodiment of a swing clamp formed in accordance with the present invention is provided. The swing clamp is adapted to selectively clamp a workpiece having a surface to be worked upon to a support surface. The swing clamp includes a housing and an actuator at least partially disposed within the housing. A clamp arm is coupled to the actuator, wherein the actuator is adapted to actuate the clamp arm between a clamped position, an unclamped position, and a retracted position. In the retracted position, the clamp arm is adapted to be disposed below an elevation of the surface to be worked upon.

Another embodiment of a swing clamp formed in accordance with the present invention is provided. The swing clamp is adapted to selectively clamp a workpiece having a surface to be worked upon to a support surface. The swing clamp includes a housing and an actuator at least partially disposed within the housing. A clamp arm is coupled to the actuator, the clamp arm having at least a first arm and a second arm. Each arm is adapted to alternately engage and clamp the workpiece. The actuator is adapted to configure the clamp arm between a first clamped position in which the first arm is adapted to clamp the workpiece to the support surface, a second clamped position in which the second arm is adapted to clamp the workpiece to the support surface, and an unclamped position.

Still another embodiment of a swing clamp formed in accordance with the present invention is provided. The swing clamp is adapted to selectively clamp a workpiece having a surface to be worked upon to a support surface. The swing clamp includes a housing and an actuator at least partially disposed within the housing. A clamp arm is coupled to the actuator. A cam assembly is disposed at least partially within the housing. The cam assembly includes a branched cam having a first portion which branches to at least a first branch and a second branch. The cam assembly also includes a cam follower adapted to interface with the branched cam to guide the actuation of the clamp arm between a first position and a second position.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Referring to FIGS. 1–7, one embodiment of a swing clamp 100 formed in accordance with the present invention is shown. Although the illustrated embodiment of the present invention will be described as a swing clamp for use in holding down a workpiece during a manufacturing process, those skilled in the relevant art and others will appreciate that the disclosed swing clamp 100 is illustrative in nature and should not be construed as limited to application as a workpiece holdown clamp. As those skilled in the art and others will appreciate further, the swing clamp 100 has wide application and may be used in any situation where the application of a clamping pressure is desirable. It should be noted that for purposes of this disclosure, terms, such as "upper," "lower," "vertical," and "horizontal," should be construed as descriptive and not limiting.

Figure 1:
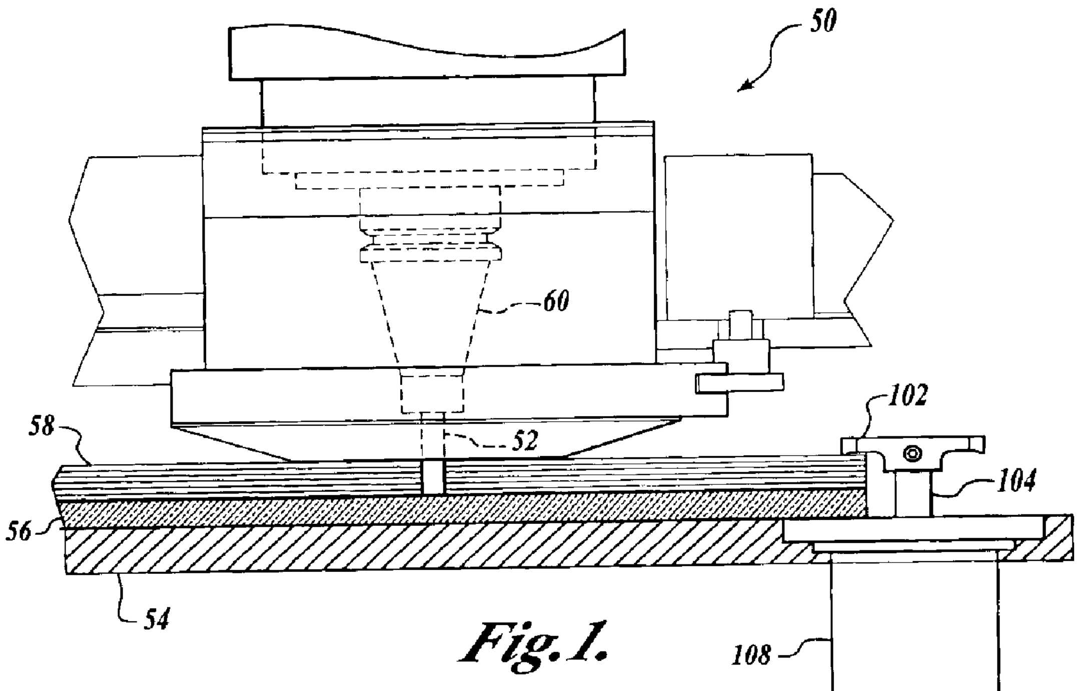
FIG. 1 is an elevation view of one embodiment of a swing clamp formed in accordance with the present invention, wherein a cam-rod and attached clamp arm of the swing clamp are shown in a clamped position holding a workpiece stationary upon a work table as the workpiece is machined by a machining device.

FIG. 1 is an environmental view showing the swing clamp 100 in relation to an exemplary machining device 50. The exemplary machining device 50 is a router 60 having a cutting tool 52. In FIG. 1, the cutting tool 52 is shown in cutting engagement with a workpiece 58. The workpiece 58 includes a plurality of thin sheets of metal, oriented in a stacked relationship upon a sacrificial sheet 56. The sacrificial sheet 56 is supported by a support surface or work table 54. The machine device 50 is selectively programmable to control the movement of the router 60 over the workpiece 58 to cut the workpiece 58 into a desired shape. The alignment of the multiple sheets of the workpiece 58 is maintained by the swing clamp. More specifically, the swing clamp 100 includes a clamp arm 102 that applies a downward clamping force to the workpiece 58, thereby compressing the workpiece 58 between the work table 54 and the clamp arm 102. (In an actual machine, a plurality of swing clamps would be located around the periphery of the work piece 58.)

The clamped and unclamped positioning of the clamp arm 102 is controlled by a well known controller (not shown) coupled to an actuation system 101 (shown in one form in FIGS. 4–9 and described below) housed within a housing or cylinder 108 that forms part of the swing clamp 100. The controller (not shown) selectively energizes the actuation system, such as by applying a pressurized fluid, a current, etc. to the actuation system. The controller may include a computer or similar device, or may include a manually operable device, such as a valve, for selectively energizing the actuation system. A cam-rod 104 couples the clamp arm 102 to the actuation system 101 (See FIG. 4) housed within the cylinder portion 108 of the swing clamp 100.

Figure 2:
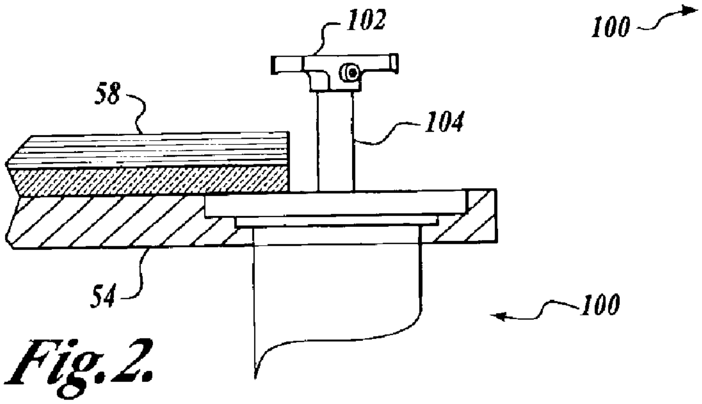
FIG. 2 is an elevation view of a portion of FIG. 1 showing the cam-rod and attached clamp arm of the swing clamp in an unclamped position, the clamp arm being displaced above the workpiece.
Figure 3:
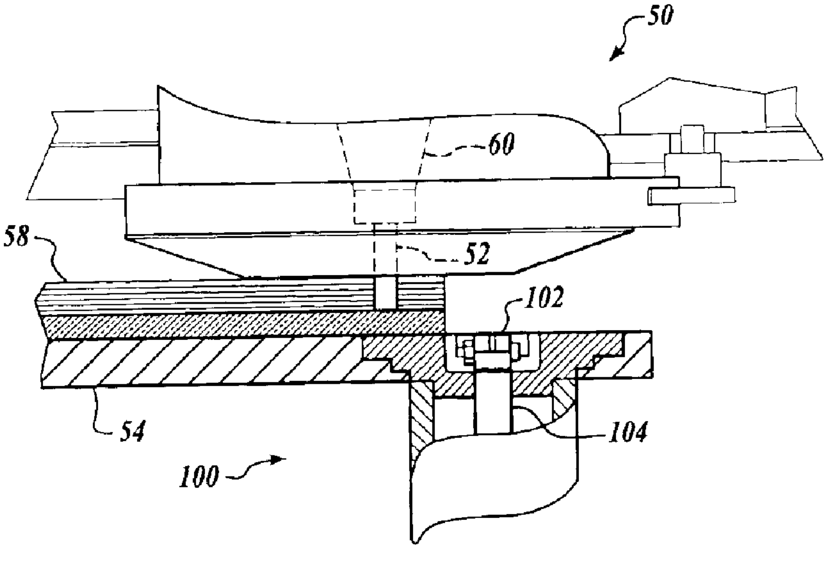
FIG. 3 is an elevation view of a portion of FIG. 1 showing the cam-rod and attached clamp arm of the swing clamp in a retracted position such that the clamp arm has been displaced away from and below the upper surface of the workpiece being machined, thereby eliminating the possibility of interference between the clamp arm and the machining device.

The swing clamp 100 is programmable to actuate the cam-rod 104 and attached clamp arm 102 between three positions: a clamped position shown in FIG. 1, an unclamped position shown in FIG. 2, and a retracted position shown in FIG. 3. With the cam-rod 104 and attached clamp arm 102 in the unclamped position shown in FIG. 2, the clamp force is removed from the workpiece 58, allowing the workpiece to be repositioned or removed from the work table 54. The unclamped position is a precursor to positioning the cam-rod 104 and attached clamp arm 102 in the retracted position.

Referring to FIG. 3, in the retracted position, the cam-rod and attached clamp arm 102 are displaced below a top surface of the workpiece 58, and more specifically, preferably below the workpiece 58, below the sacrificial sheet 56, and flush or below the upper surface of the work table 54. This positioning removes the clamp arm 102 from potential interference with the machining device 50, allowing the machining device 50 to work in the vicinity of the swing clamp 100 without interference or damage. Although in the illustrated embodiment depicted in FIGS. 1–3, only a single swing clamp 100 is shown, as briefly noted above, those skilled in the art and others will readily understand that a plurality of swing clamps would typically be used to hold down a workpiece 58. In such machines, when the machining device 50 approaches a particular swing clamp 100, the swing clamp would be actuated such that the clamp arm is moved into the retracted position. Once the machining device 50 has vacated the vicinity of the swing clamp 100, the swing clamp 100 may be actuated to move the clamp arm into the clamped position.

Figure 4:
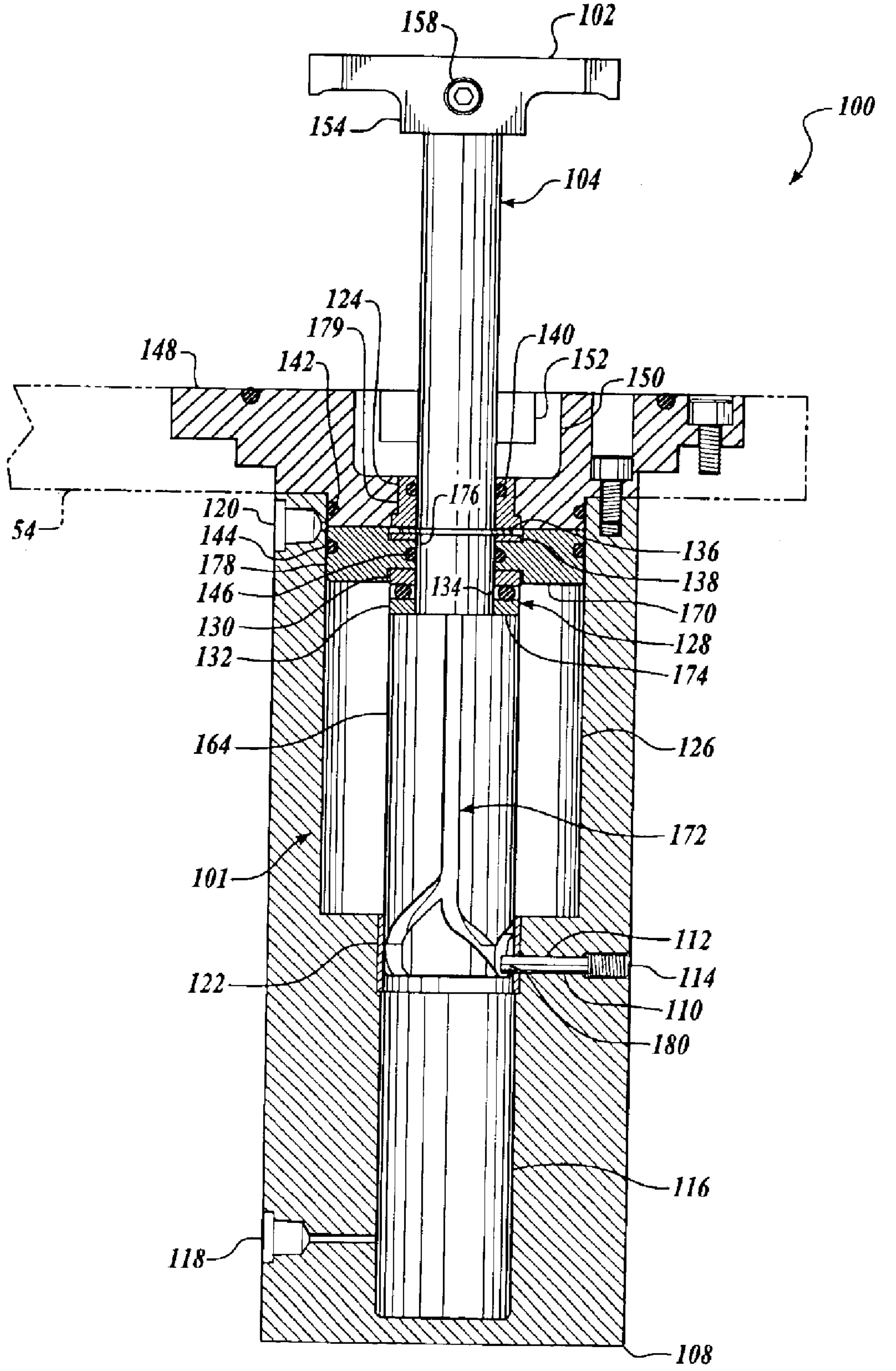
FIG. 4 is a cross-sectional view of one embodiment of a swing clamp formed in accordance with the present invention, taken substantially along line 4—4 of FIG. 5, the cam-rod and attached clamp arm shown in an unclamped position.
Figure 5:
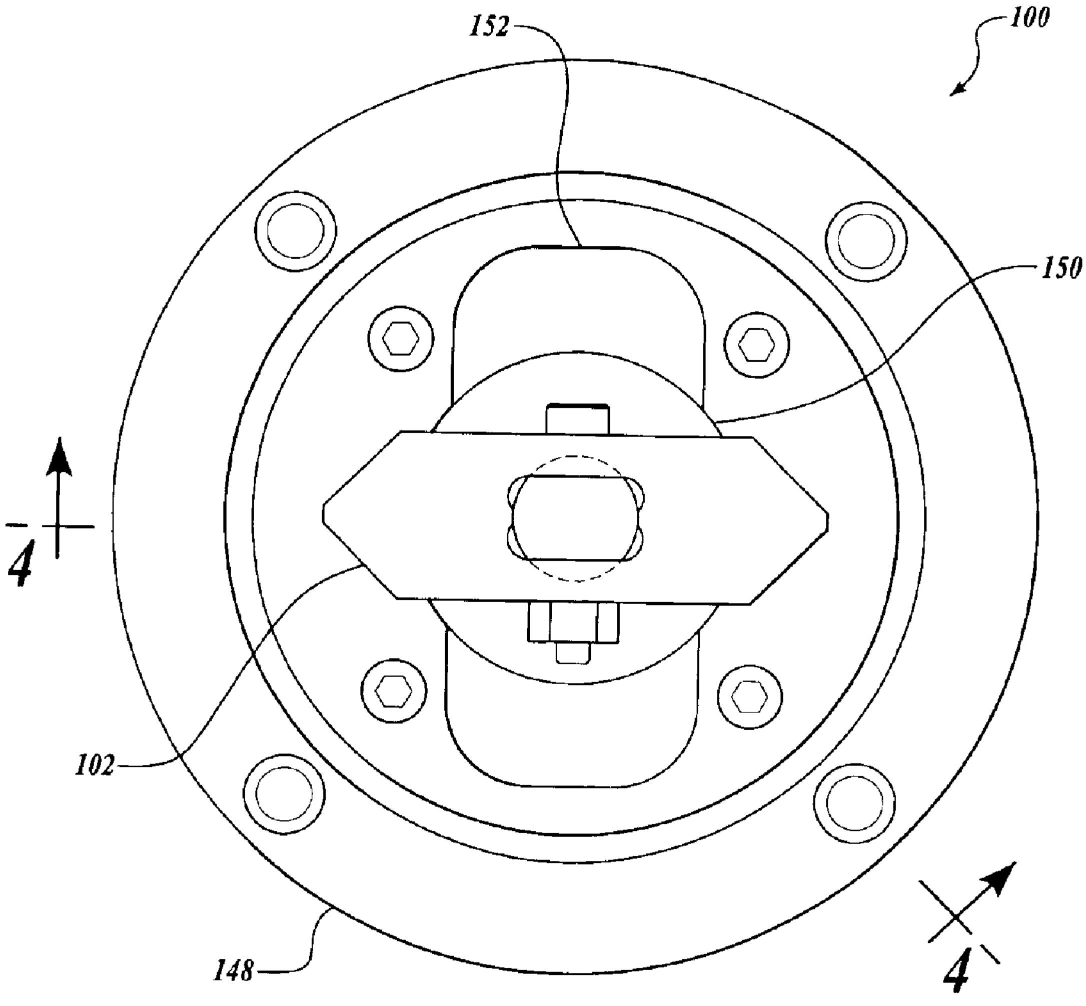
FIG. 5 is a top view of the swing clamp depicted in FIG. 4.
Figure 8:
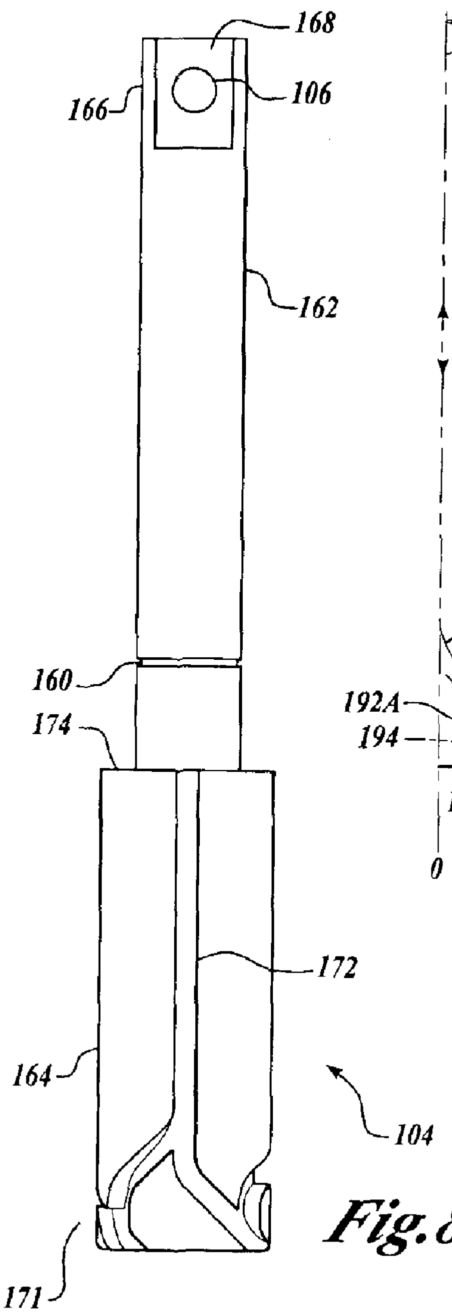
FIG. 8 is an elevation view of one embodiment of a cam-rod formed in accordance with the present invention suitable for use in the swing clamp shown in FIGS. 1–7.

Keeping in mind the above general overview of the swing clamp 100, the following description will focus on the structural components of the swing clamp 100. FIGS. 4 and 5 illustrate the cam-rod 104 and attached clamp arm 102 of the swing clamp 100 in an unclamped position. The cam-rod 104 is movable between clamped, unclamped, and retracted positions by an actuation system 101 housed within the cylinder 108 of the swing clamp 100. As best shown in FIG. 8, the cam-rod 104 comprises an upper shaft 162 axially aligned and coupled to a lower cam groove cylinder 164. Two mounting flats 168 are machined on opposite sides of an upper distal end 166 of the upper shaft 162 in a parallel arrangement. Referring to FIGS. 4, 5, and 8, bored perpendicularly through the mounting flats 168 is a bore 106 for accepting a well-known fastener 158 (FIG. 4). The mounting flats 168, in combination with the fastener 158, facilitate the attachment of the clamp arm 102 to the cam-rod 104. Disposed between the upper distal end 166 of the upper shaft 162 and the lower cam groove cylinder 164 is an annular groove 160. The annular groove 160 is radially disposed around the upper shaft 162 and is configured to receive a retaining ring 136 (FIG. 4), such as an E-clip. The retaining ring 136 serves to impede the upward movement of a piston 170 slidingly mounted on the upper shaft 162, thereby retaining the piston 170 between the retaining ring 136 and a shoulder 174 of the cam groove cylinder 164.

Still referring to FIGS. 4, 5, and 8, the cam groove cylinder 164 is concentrically aligned with the upper shaft 162. The cam groove cylinder 164 has a cam groove network 172 disposed on its outer surface. The purpose and operation of the cam groove network 172 will be discussed in further detail below. The diameter of the cam groove cylinder 164 is greater than the diameter of the upper shaft 162, thereby creating the shoulder 174 at the interface of the upper shaft 162 with the cam groove cylinder 164.

Referring to FIG. 4, the shoulder 174 provides a support surface for a thrust bearing 128. The thrust bearing 128 is comprised of an upper annular race 130 spaced from a lower annular lower race 132. Disposed between the annular races is a plurality of ball bearings 134. The ball bearings 134 allow a compression force (thrust) to be absorbed by the annular races 130 and 132 while still permitting the rotation of the upper annular race 130 relative to the lower annular race 132. The lower race 132 engages the shoulder 174 of the cam groove cylinder 164. The upper race 130 engages the piston 170. This arrangement allows the thrust bearing 128 to enhance the rotational freedom of the piston 170 relative to the upper shaft 162 during loading of the piston in a downward direction.

The piston 170 will now be described in further detail. The piston 170 is a disc-shaped member having an inner aperture 176 having a diameter sized to rotatingly receive the upper shaft 162. The outer diameter 178 of the piston is selected to be reciprocatingly received by an upper cylinder bore 126 of the cylinder 108. Disposed on the outer cylindrical surface of the piston 170 is an annular groove for receiving an O-ring 144. The O-ring 144 substantially seals the outer cylindrical surface of the piston 170 with the inner cylindrical wall of the upper cylinder bore 126. The piston 170 is coupled to the upper shaft 162 by the interaction of the retaining ring 136 upon a washer 138 disposed in an annular recess in the upper portion of the piston 170 and the thrust bearing 128 in combination with the shoulder 174 of the cam groove cylinder 164. Thus the piston 170 is impeded from longitudinal movement along the axis of the cam-rod 104 by sandwiching the piston 170 between the retaining ring 136 and washer 138 on the upper side, and on the lower side, between the shoulder 174 of the cam groove cylinder 164 and the thrust bearing 128.

The cylinder 108 will now be described in further detail. The cylinder 108 is cylindrical in shape, preferably having a constant outer diameter. The cylinder 108 houses a lower cylinder bore 116 of a first diameter and an upper cylinder bore 126 of a greater second diameter. The lower cylinder bore 116 is sized to reciprocatingly receive the cam groove cylinder 164. The upper cylinder bore 126 is sized to reciprocatingly receive the piston 170. In fluid communication with the lower cylinder bore 116 is an extender port 118. The extender port 118 couples a pressurizable fluid line (not shown) with the lower cylinder bore 116, to permit the selective pressurization of the lower cylinder bore 116. A retractor port 120 located in the upper portion of the cylinder 108 couples a pressurizable fluid line (also not shown) to the upper cylinder bore 126 to permit the selective pressurization of the upper cylinder bore 126. The extender port 118 and retractor port 120 are located such that pressurized fluid in their respective bores can be discharged as the other bore is pressurized. The cam-rod 104 is moved in an upward direction by injecting a pressurized fluid through the extender port 118. The pressurized fluid applies a force to the bottom surface of the piston 170 which causes upward movement of the cam-rod 104. Downward movement of the cam-rod 104 is created by applying a pressurized fluid to the retractor port 120. The pressured fluid applies a force to the top surface of the piston 170 which causes downward movement of the cam-rod 104. While the preferred pressurized fluid is air, it will be apparent to those skilled in the art and others that other actuating fluids, such as hydraulic oil, can be used. Further, other actuating devices, such as electrical solenoid actuating devices, can be used and fall within the scope of the present invention.

The cylinder 108 further includes a cam follower passageway 112 radially bored through a wall of the cylinder 108. Disposed within the cam follower passageway 112 is a cam follower 110. The cam follower 110 is comprised of a rod sized to slidably fit within the cam follower passageway 112. Preferably, the cam follower 110 is constructed from a hardened, high-strength material. Abutting the outer distal end of the cam follower 110 is a cam follower retainer 114. The cam follower retainer 114 acts as a plug to prevent the backing out of the cam follower 110 from the cam follower passageway 112.

Inserted within the upper end of lower cylindrical bore 116 of the cylinder 108 is a lower bushing 122. The lower bushing is sized to reciprocatingly receive the cam groove cylinder 164. The lower bushing 122 serves to maintain the axial alignment of the cam-rod 104 during operation. More specifically, as an upward force is exerted upon one side of the double-sided clamp arm 102 during clamping operations, a large moment is exerted upon the cam-rod 104, tending to misalign the cam-rod 104. The lower bushing 122, in coordination with an upper bushing 124 (described in detail below), counteract the large moment forces exerted upon the cam-rod 104, thereby maintaining the axial alignment of the cam-rod 104.

The swing clamp 100 also includes a cylinder head 148. The cylinder head 148 is constructed to mate with the cylinder 108 and seal the open end of the cylinder 108, thereby creating a pressure vessel defined by the upper cylinder bore 126 and the lower cylinder bore 116. To aid in the maintaining of pressure within the upper cylinder bore 126 and the lower cylinder bore 116, an O-ring 142 is located between the cylinder 108 and the cylinder head 148. The upper shaft 162 of the cam-rod 104 passes through a bore 179 concentrically machined in the cylinder head 148.

Mounted within the bore 179 is the upper bushing 124. The upper bushing 124 is configured to reciprocatingly receive the upper shaft 162 of the cam-rod 104. Disposed within an annual groove radially formed on the upper bushing 124 is an O-ring 140. The O-ring 140 aids in the prevention of blow-by, thereby preventing pressurized air injected through the retractor port 120 from escaping from the upper cylinder bore 126 while simultaneously impeding the entrance of contaminates into the cylinder 108. The upper bushing 124, as described above, aids in maintaining the axial alignment of the cam-rod 104.

Figure 6:
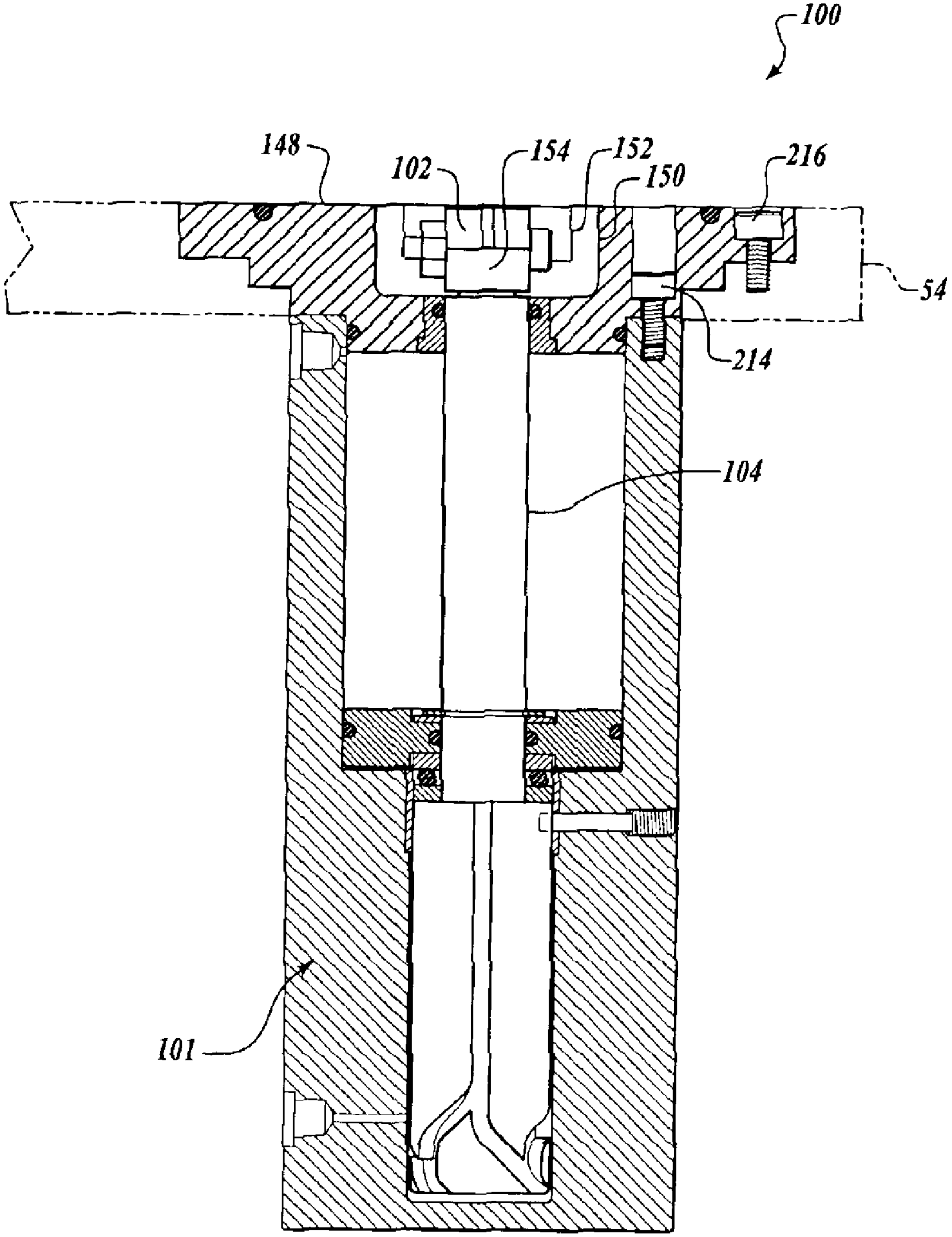
FIG. 6 is a cross-sectional view of the swing clamp depicted in FIG. 4 taken substantially along line 6—6 of FIG. 7, the cam-rod and attached clamp shown in a retracted position.
Figure 7:
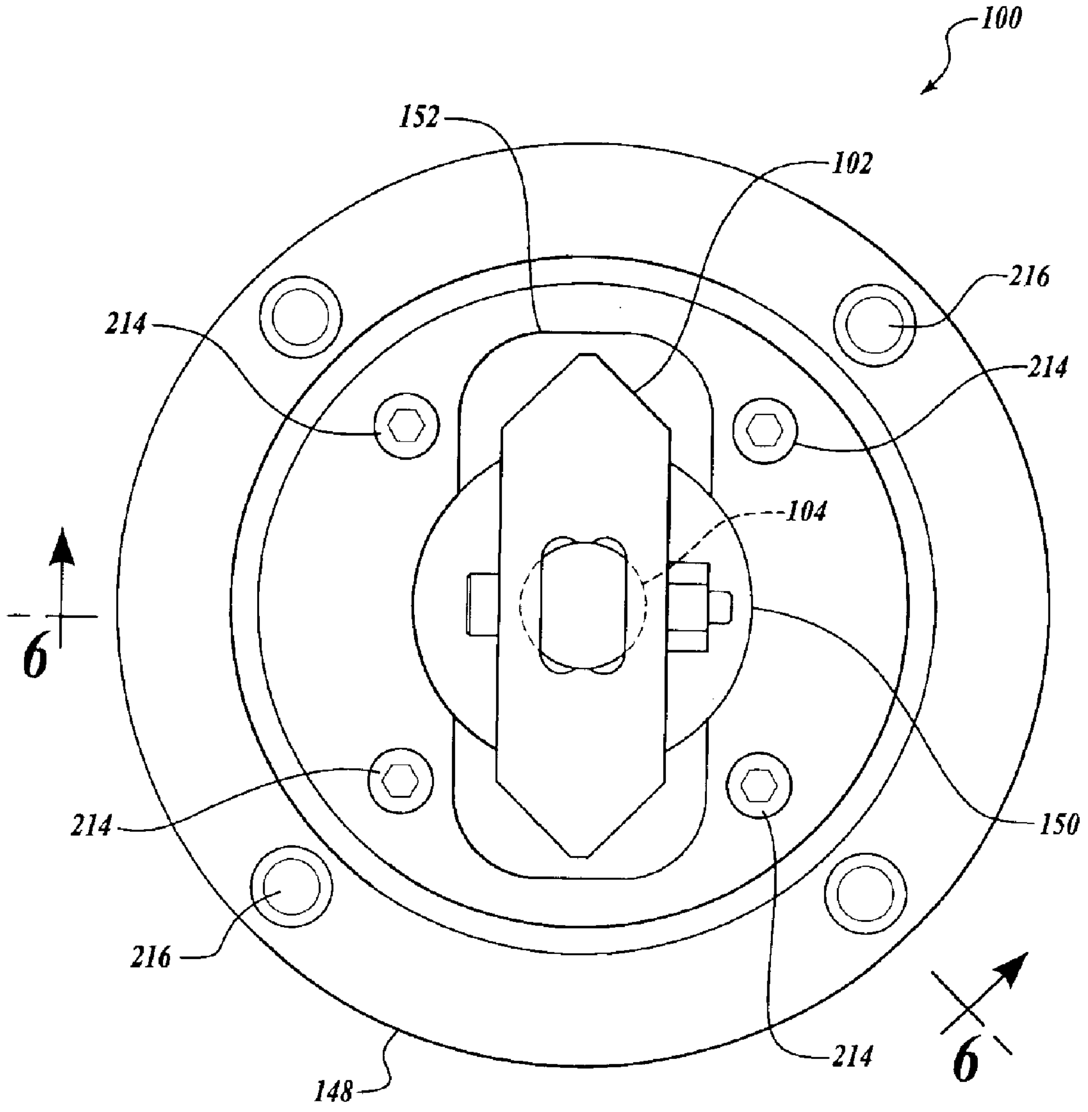
FIG. 7 is a top view of the swing clamp depicted in FIG. 6.
Figure 10:
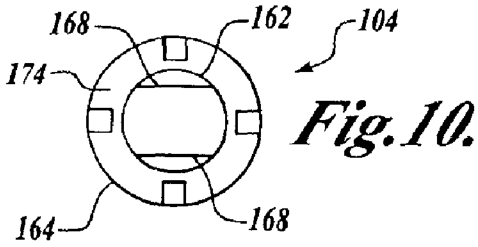
FIG. 10 is a top view of the cam-rod shown in FIG. 8.
Figure 9:
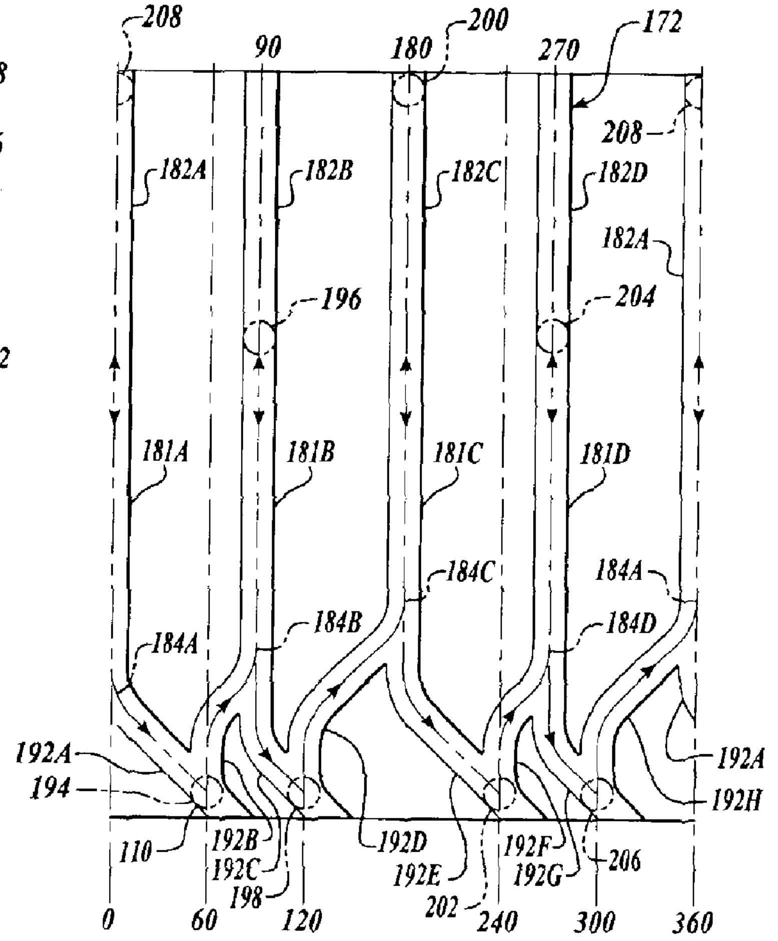
FIG. 9 is a flat representation of the outer surface of a lower cylindrical portion of the cam-rod shown in FIG. 8, depicting a configuration of a cam groove network formed on the surface of the low cylindrical portion of the cam-rod.

Referring to FIGS. 6 and 7, machined in the upper portion of the cylinder head 148 is a clamp arm recess 152 and a clamp arm base recess 150. The clamp arm recess 152 is sized with sufficient width, length, and depth to receive the clamp arm 102. The clamp arm base recess 150, which is circular in shape, is sized with a sufficient diameter and depth to receive the clamp arm base 154 therein. Thus when the cam-rod 104 is positioned in the retracted position, the clamp arm 102 is fully retracted within the cylinder head 148 thereby providing maximum clearance for machining devices operating on the work piece 58.

Referring to FIGS. 6 and 7, the cylinder head 148 is mounted to the cylinder 108 by well known fasteners 214. Likewise, the cylinder head 148 is mounted to the work table 54 by well know fasteners 216. Although the swing clamp 100 of the illustrated embodiment of the present invention is depicted with a specific mounting system, it should be apparent to one skilled in the art that any number of methods of mounting the swing clamp to a work table 54 may be employed. For instance, the cylinder head 148 or the cylinder 108 may include a threaded portion for removably mounting the swing clamp 100 to a mounting aperture in the work table 54 having reciprocal threads machined therein. Further still, although the illustrated embodiment is depicted as mounted to the work table 54, it should be apparent to one skilled in the art that the swing clamp 100 may be mounted to any structure to best accommodate the desired machining operations. For example, the swing clamp 100 may be mounted to a holding structure, examples of such structures often referred to as “tombstones” or “pallets” in the trade, which is then set and rigidly held upon the work table 54.

Referring to FIGS. 4 and 8–10, the cam groove network 172 disposed on the cam groove cylinder 164 will now be described in further detail. The cam groove network 172 is comprised of a plurality of interconnected grooves machined into the outer surface of the cam groove cylinder 164. Generally stated, the shape of the grooves forming the cam groove network 172 controls the orientation of the clamp arm 102 in relation to the workpiece. The width of the grooves of the cam groove network 172 is selected to slidingly receive the inner distal end 180 of the cam follower 110. The depth of the grooves of the cam groove network 172 is selected to provide sufficient strength to prevent the deformation of the grooves of the cam groove network 172 when engaged with the cam follower 110. The cam groove network 172 includes four branched cam grooves 181A, 181B, 182C, and 181D. Each branched cam groove 181 includes a longitudinal segment 182A, 182B, 182C, or 182D oriented vertically and at 90 degree intervals about the circumference of the cam groove cylinder 164. Each longitudinal segment 182A, 182B, 182C, and 182D is substantially linear in shape and terminates in a branched segment 184A, 184B, 184C, and 184D. The four longitudinal segments 182A, 182B, 182C, and 182D guide the cam-rod 104 during vertical, linear movement, while the branched segments 184A, 184B, 184C, and 184D guide the cam-rod 104 during a vertical and rotational phase of cam-rod 104 movement. The branched segments 184 are accordingly substantially arcuate in shape.

Each branched segment 184A, 184B, 184C, and 184D has two branch portions. Each branch may be classified by its degree of rotation and direction of intended travel. More specifically, each branch is oriented to initiate either a 30-degree or a 60-degree rotation of the cam-rod 104. Further, each branch is tracked by the cam follower 110 during the upward movement of the cam-rod 104 or the downward movement of the cam-rod 104 exclusively. Using the above designations, the classification of each branch will be noted as one travels from left to right of FIG. 9. The right branch 192A of branched segment 184A is a downward movement, 60-degree rotation branch. The left branch 192B of branched segment 184B is an upward movement, 30 degree rotation branch while the right branch 192C is a downward movement, 30 degree rotation branch. The left branch 192D of branched segment 184C is an upward movement, 60-degree rotation branch, while the right branch 192E is a downward movement, 60-degree rotation branch. The left branch 192F of branched segment 184D is an upward movement, 30-degree rotation branch, while the right branch 192G is a downward movement, 30-degree rotation branch. The left branch of branched segment 184A is an upward movement, 60-degree rotation branch.

The movement of the cam-rod 104 during operation will now be discussed in further detail. For purposes of this detailed description, the discussion of the movement of the cam-rod 104 will begin with the cam follower 110 located within the grooves of the cam groove network 172 at a starting position indicated by reference numeral 194. Of note, reference numeral 194 represents the position of the cam follower 110 at a point in time when the cam-rod 104 is located at an unclamped position, i.e. a Top Dead Center (TDC) position, with the clamp arm rotated 30 degrees counterclockwise (when viewed from above) from alignment with an imaginary line extending normal from an edge of the work table. As the cam-rod 104 is actuated vertically downward from this position, the cam follower 110 slides within branch 192B. Of note, the cam follower 110 does not reenter branch 192A since the vertically oriented momentum of the cam-rod 104 carries the cam-rod 104 past branch 192A. In addition, the rotational friction induced by bushings 122 and 124, O-rings 140 and 146, piston 170, and thrust bearing 128, albeit minimal, upon the cam-rod 104 impede the cam-rod 104 from rotating, thus preventing the cam follower 110 from reentering branch 192A.

Once the cam follower 110 enters branch 192B, due to the arcuate shape of branch 192B, the cam-rod 104 and attached clamp arm 102 are rotated 30 degrees clockwise so as to align the clamp arm 102 with the imaginary line extending normal from the work table. As the cam follower 110 enters and rides within the longitudinal segment 182B, the clamp arm 102 reciprocates vertically downward upon the workpiece, engaging the workpiece and applying a clamping force upon the workpiece. With the cam-rod 104 in the fully clamped position, the location of the cam follower 110 is indicated by reference numeral 196. As should be apparent to one skilled in the art, the vertical position of reference numeral 196 along the longitudinal segment 182B is determined by the thickness of the workpiece.

As the cam-rod 104 is actuated upward to release the workpiece from the clamping force, the cam-follower 110 slides within the longitudinal segment 182B, therein entering branch 192C. Due to the arcuate shape of branch 192C, the cam-rod 104 and attached clamp arm 102 are rotated 30 degrees clockwise so as to rotate the clamp arm 102 30 degrees clockwise from the imaginary line extending normal from the work table. The cam-rod 104 and attached clamp arm 102 are now positioned in the unclamped TDC position. The position of the cam follower at TDC is indicated by reference numeral 198. As the cam-rod 104 is actuated downward from TDC, the cam follower 110 enters branch 192D. Due to the arcuate shape of branch 192D, the cam-rod 104 and attached clamp arm 102 are rotated 60 degrees clockwise, orienting the clamp arm 102 perpendicularly to the imaginary line extending normal from the work table. As the cam follower enters and rides within the longitudinal segment 182C, the clamp arm 102 reciprocates vertically downward until recessed within the cylinder head 148. In this position, the cam-rod 104 and attached clamp arm 102 are displaced below the top surface of the workpiece, thus eliminating the possibility of the cam-rod 104 and attached clamp arm 102 from interfering with the movement of the machining device. Reference numeral 200 indicates the position of the cam follower 110 when the cam-rod 104 reaches the fully retracted position, i.e. Bottom Dead Center (BDC) position.

As the cam-rod 104 is actuated upward from the BDC position, the cam-follower 110 slides within the longitudinal segment 182C from the position of the cam-follower 110 indicated by reference numeral 200, and enters branch 192E. Due to the arcuate shape of branch 192E, the cam-rod 104 and attached clamp arm 102 are rotated 60 degrees clockwise so as to rotate the clamp arm 102 30 degrees clockwise from the imaginary line extending normal to the work table. The position of the cam follower at TDC is indicated by reference numeral 202. As the cam-rod 104 is actuated downward from TDC, the cam follower 110 enters branch 192F. The motion of the cam-rod 104 and attached clamp arm 102 as the cam follower 110 travels through branch 192F and the remaining portion of the cam groove network 172 is identical to the motion described above for the first half of the cam groove network 172. Therefore, the motion of the cam follower through the second half of the cam groove network 172 will be omitted for brevity.

Although specific degrees of angular displacement are described relative to each branch 192, it should be apparent to one skilled in the art that other angular displacements may be associated with each branch 192. For instance, each branch may initiate a 45-degree rotation of the cam-rod 104. Or each branch may initiate a 90 degree rotation or other selected angular displacement such that the clamp arm rotates 360 degrees in one direction when the clamp arm is actuated from the clamped position to the unclamped position, to the retracted position, to the unclamped position, and back to the unclamped position. Thus, as should be apparent to those skilled in the art, in this configuration, only two branched cam grooves 181 are required. Further, although the orientation of the cam groove network 172 of the illustrated embodiment causes the cam-rod 104 to rotate in a clockwise direction when viewed from above, it should be apparent to one skilled in the art that by forming a cam groove cylinder 164 having a mirror image of the cam groove network 172 of the illustrated embodiment formed thereon, the cam-rod 104 may be directed in a counterclockwise direction. Further still, although the illustrated embodiment depicts a cam groove network 172 having four branched cam grooves 181, it should be apparent to one skilled in the art that a cam groove network 172 having any number of branched cam grooves 181, such as two, is suitable for use, and thus falls within the scope of the present invention.

Further still, although the above described embodiment depicts a cam assembly using a cam groove network 172 disposed upon the cam groove cylinder 164, with a cam follower 110 coupled to the cylinder 108, it should be apparent to those skilled in the art that this arrangement may be reversed. Moreover, it should be apparent to those skilled in the art that the cam follower 110 may be disposed upon the cam groove cylinder 164 and the cam groove network 172 disposed upon the cylinder 108. Further, although the illustrated embodiment depicts a cam follower engaging a groove, it should be apparent that any type of cams and cam followers are suitable for use with and are within the spirit and scope of the present invention. For instance, the cam may be a rib which extends outward from the cam groove cylinder 164, engaging a u-shaped cam follower coupled to the cylinder 108.

While the preferred embodiment of the invention has been illustrated and described, it will be appreciated that various changes can be made therein without departing from the spirit and scope of the invention.

What is claimed is:

1. A swing clamp for selectively clamping a workpiece having a surface to be worked upon to a support surface, the swing clamp comprising:

(a) a housing;

(b) a clamp arm; and (c) an actuator coupled to the clamp arm for moving the clamp arm between a clamped position, an unclamped position, and a retracted position, when in said retracted position said clamp arm is disposed below the elevation of the surface to be worked upon; and wherein the clamp arm is both linearly and rotatably displaced when moved between the clamped and retracted positions.

2. The swing clamp of claim 1, wherein the clamp arm is displaced such that a distal end of the clamp arm travels along a path having a substantially linear portion and an arcuate portion when the clamp arm is moved between the unclamped and retracted positions.

3. The swing clamp of claim 1, wherein the clamp arm rotates approximately 180 degrees in one direction when the clamp arm is moved from the clamped position to the retracted position and back to the clamped position.

4. The swing clamp of claim 1, wherein the clamp arm rotates approximately 360 degrees in one direction when the clamp arm is moved from the clamped position to the retracted position and back to the clamped position.

5. The swing clamp of claim 1, wherein when the clamp arm is in the retracted position, the clamp arm is disposed below the elevation of the support surface.

6. The swing clamp of claim 1, wherein when the clamp arm is in the retracted position, the clamp arm is disposed substantially within a recess in the housing.

7. The swing clamp of claim 1, further comprising a cam assembly disposed at least partially within the housing, the cam assembly comprising a cam follower and a cam network, the cam follower interfacing with the cam network to guide the movement of the clamp arm between the clamped, unclamped, and retracted positions.

8. The swing clamp of claim 7, wherein the cam network is comprised of at least one branched cam having a first portion that branches to a first branch and a second branch.

9. The swing clamp of claim 8, wherein the first portion of the branched cam is substantially linear in shape and the branches of the branched cam are substantially arcuate in shape.

10. The swing clamp of claim 7, wherein the cam network is comprised of a plurality of branched cams each having a first portion that branches to a first branch and a second branch, the branches of each branched cam joining the branches of an adjacent branched cam.

11. The swing clamp of claim 1, wherein when the clamp arm is located at: (i) the clamped position, the clamp arm is at a first elevation; (ii) the unclamped position, the clamp arm is at a second elevation greater than the first elevation; and (iii) the retracted position, the clamp arm is at a third elevation less than the first elevation.

12. The swing clamp of claim 1, wherein the clamp arm includes a first arm and a second arm, each arm adapted to engage and clamp the workpiece.

13. The swing clamp of claim 12, wherein the first arm is oriented in a first direction and the second arm is oriented in a second direction substantially opposite the first direction.

14. A swing clamp for selectively clamping a workpiece having a surface to be worked upon to a support surface, the swing clamp comprising:

(a) a housing;

(b) a clamp arm having a first arm and a second arm, wherein the first arm extends in a first direction and the second arm extends in a second direction substantially opposite the first direction; and (c) an actuator coupled to the clamp arm for moving the clamp arm between a first clamped position in which the first arm is adapted to clamp the workpiece to the support surface, a second clamped position in which the second arm is adapted to clamp the workpiece to the support surface, and an unclamped position.

15. The swing clamp of claim 14, wherein the clamp arm rotates in a first direction when moving from the first clamped position to the unclamped position and further in the first direction when moving from the unclamped position to the second clamped position.

16. The swing clamp of claim 14, wherein the actuator further moves the clamp arm to a retracted position wherein the clamp arm is disposed below the elevation of the surface to be worked upon.

17. A swing clamp for selectively clamping a workpiece having a surface to be worked upon to a support surface, the swing clamp comprising:

(a) a housing;

(b) a clamp arm; and (c) an actuator coupled to the clamp arm, said actuator includes a cam assembly disposed at least partially within the housing, the cam assembly comprising;

(i) a branched cam having a first portion which branches to a first branch and a second branch, wherein the first portion of the branched cam is substantially linear in shape and the branches of the branched cam are substantially arcuate in shape; and (ii) a cam follower adapted to interface with the branched cam for guiding the movement of the clamp arm between a first position and a second position.

18. The swing clamp of claim 17, wherein the cam assembly is comprised of a plurality of branched cams each having a first portion which branches to a first branch and a second branch, the branches of each branched cam joining the branches of an adjacent branched cam.

19. The swing clamp of claim 17, wherein the branched cam is disposed in a shaft that forms part of the actuator.

20. The swing clamp of claim 17, wherein the branched cam is formed by a groove.

21. A swing clamp for selectively clamping a workpiece having a surface to be worked upon to a support surface, the swing clamp comprising:

(a) a housing;

(b) a clamp arm; and (c) an actuator coupled to the clamp arm for moving the clamp arm between a clamped position, an unclamped position, and a retracted position, when in said retracted position said clamp arm is disposed below the elevation of the surface to be worked upon, wherein the clamp arm is displaced such that a distal end of the clamp arm travels along a path having a substantially linear portion and an arcuate portion when the clamp arm is moved between the unclamped and retracted positions.

22. A swing clamp for selectively clamping a workpiece having a surface to be worked upon to a support surface, the swing clamp comprising:

(a) a housing;

(b) a clamp arm; and (c) an actuator coupled to the clamp arm for moving the clamp arm between a clamped position, an unclamped position, and a retracted position, when in said retracted position said clamp arm is disposed below the elevation of the surface to be worked upon, wherein the clamp arm rotates approximately 180 degrees or approximately 360 degrees in one direction when the clamp arm is moved from the clamped position to the retracted position and back to the clamped position.

23. A swing clamp for selectively clamping a workpiece having a surface to be worked upon to a support surface, the swing clamp comprising:

(a) a housing;

(b) a clamp arm;

(c) an actuator coupled to the clamp arm for moving the clamp arm between a clamped position, an unclamped position, and a retracted position, when in said retracted position said clamp arm is disposed below the elevation of the surface to be worked upon; and (d) a cam assembly disposed at least partially within the housing, the cam assembly comprising a cam follower and a cam network, the cam follower interfacing with the cam network to guide the movement of the clamp arm between the clamped, unclamped, and retracted positions.

24. A swing clamp for selectively clamping a workpiece having a surface to be worked upon to a support surface, the swing clamp comprising:

(a) a housing;

(b) a clamp arm; and (c) an actuator coupled to the clamp arm for moving the clamp arm between a clamped position, an unclamped position, and a retracted position, when in said retracted position said clamp arm is disposed below the elevation of the surface to be worked upon, wherein when the clamp arm is located at: (i) the clamped position, the clamp arm is at a first elevation; (ii) the unclamped position, the clamp arm is at a second elevation greater than the first elevation; and (iii) the retracted position, the clamp arm is at a third elevation less than the first elevation.

* * * * *

UNITED STATES PATENT AND TRADEMARK OFFICE
CERTIFICATE OF CORRECTION

PATENT NO. : 6,932,333 B2
DATED : August 23, 2005
INVENTOR(S) : G.B. Bode

It is certified that error appears in the above-identified patent and that said Letters Patent is hereby corrected as shown below:

Column 11,
Line 28, "said actuator includes" should read -- said actuator including --.
Line 55, "position, when" should read -- position, wherein when --.

Column 12,
Lines 14, 29 and 46, "position, when" should read -- position, wherein when --.

Signed and Sealed this

Fourteenth Day of February, 2006

JON W. DUDAS
*Director of the United States Patent and Trademark Office*